United States Patent [19]

Yu

[11] Patent Number: 4,919,545

[45] Date of Patent: Apr. 24, 1990

[54] DISTRIBUTED SECURITY PROCEDURE FOR INTELLIGENT NETWORKS

[75] Inventor: Che-Fn Yu, Chelmsford, Mass.

[73] Assignee: GTE Laboratories Incorporated, Waltham, Mass.

[21] Appl. No.: 288,779

[22] Filed: Dec. 22, 1988

[51] Int. Cl.$^5$ ............................ H04K 1/00; G07D 7/00
[52] U.S. Cl. ................................................. 380/25; 380/3; 380/23; 340/825.34
[58] Field of Search ................... 380/3, 4, 23, 24, 25, 380/30; 340/825.34

[56] References Cited

U.S. PATENT DOCUMENTS

| | | | |
|---|---|---|---|
| 3,956,615 | 5/1976 | Anderson et al. | 340/825.34 X |
| 4,652,990 | 3/1987 | Pailen et al. | 380/4 X |
| 4,723,283 | 2/1988 | Nagasawa et al. | 380/20 |
| 4,759,062 | 7/1988 | Traub et al. | 380/25 |
| 4,799,258 | 1/1989 | Davies | 380/23 X |

OTHER PUBLICATIONS

G. T. Almes et al., "The Eden System: A Technical Review", IEEE Trans. Software Eng., vol. SE-11, No. 1, Jan. 1985, pp. 43–59.

A. S. Tannenbaum et al., "Using Sparse Capabilities, etc.", Proc. 6th IEEE Int. Conf. Distributed Computing Syst., 1986, pp. 558–563.

Primary Examiner—Stephen C. Buczinski
Assistant Examiner—Linda J. Wallace
Attorney, Agent, or Firm—Wolf, Greefield & Sacks

[57] ABSTRACT

A security technique for use in an intelligent network. The security technique provides a method for authorizing access by a process located in an invocation node to an object, or a network resource, located in an execution node. The method includes the steps of granting permission to the invocation node to access the object by transmitting a capability and a signature from the execution node to the invocation node. The capability includes a unique indentifier of the object and access rights to the object. The signature is formed at the execution node by encryption of the capability with an encryption key that is unique to the invocation node and is stored only in the execution node. A request for access to the object is transmitted with the capability and the signature from the invocation node to the execution node. At the execution node, the request is authenticated by encryption of the capability with the encryption key that is associated with the invocation node to form a test signature. Access to the object is authorized only when the test signature matches the signature received from the invocation node.

7 Claims, 4 Drawing Sheets

DISTRIBUTED SECURITY PROCEDURE FOR INTELLIGENT NETWORKS

FIELD OF THE INVENTION

This invention relates to a technique for preventing unauthorized access to network resources and network services in intelligent networks and, more particularly, to a security procedure which uses capability and signature techniques in distributed control of object based intelligent networks.

BACKGROUND OF THE INVENTION

Intelligent computer networks include a plurality of interconnected network nodes, each having specified resources. In executing a process at one node it is frequently necessary for the process to utilize resources located at one or more other nodes. When one node has access to resources at another node of the network, security problems can arise. The security problems include: (1) unauthorized disclosure and modification of one customer's database by other customers, and (2) the danger that customers will access and/or change network control information, such as communication control. To prevent such security problems, the network must be equipped with protection mechanisms to insure data security and network integrity.

The Intelligent Network/2 (IN/2) is an example of a distributed telecommunication network architecture which is being developed to support future switched network services. The IN/2 concept is described by R.J. Hass et al in "Intelligent Network/2: A Network Architecture Concept for the 1900's", *Proc. IEEE Int. Switching Symp.*, Phoenix, Ariz., March 1987, pp 944–951. The IN/2 concept builds upon existing network technoloqies to provide more service functions and more user control over the services. In addition, the IN/2 concept enables enhanced service providers to use basic service elements of the telephone network for their customers to access the enhanced services. Under the IN/2 concept, the future network is a distributed system in which more network resources, such as databases and basic service elements, are shared by different service users. While the IN/2 concept provides opportunities to introduce new services more conveniently and more flexibly, it also introduces additional security problems which result primarily from increased customer control and tighter coupling between vendor networks.

In the past, the use of security techniques in the intelligent network service environment has been minimal. Existing security control in telecommunication networks has been restricted to the customer interface level, such as use of password codes for valid login, or the network communication level, such as use of cryptoqraphy techniques in message transmission. These techniques are insufficient for the protection of unauthorized network resource and service accesses, especially for accesses at an operating system level.

Security techniques used for protection of information in conventional computer and distributed systems include capability based protection, access control list based protection and multilevel security. The first two techniques belong to discretionary security control, while the last one belongs to mandatory security control. These techniques have customarily been applied to the protection of centralized operating systems. Security mechanisms have occasionally been used in distributed systems. See for example, G. T. Almes et al, "The Eden System: A Technical Review", *IEEE Trans. Software Eng.*, Vol. SE-11, No. 1, January 1985, pp 43–59 and A. S. Tanenbaum et al, "Using Sparse Capabilities in a Distributed Operating System", *Proc. 6th IEEE Int. Conf. Distributed Comp. Syst.*, 1986, pp 558–563.

Previous security measures used in intelligent network services are inadequate for protection of unauthorized resource and service accesses. In general, a customer is allowed to access only his private database or purchased services within the network. However, when a password mechanism is used as the only safeguard, a customer that is successfully logged onto to the system can access all network data and services, including those that are unauthorized for him. The use of cryptography techniques in message transmission insures only that the messages are protected during transmission. There is no protection after messages are received at another node. Such messages may include unauthorized invocations of services located at remote network nodes.

Security techniques used in conventional computer and distributed operating systems cannot be applied directly to intelligent networks because there are significant differences between the service environments of traditional computer systems and intelligent networks. Some of these differences are as follows. Centralized protection mechanisms cannot insure safe use of distributed network resources and services because activities at one network node are beyond the control of other nodes. Conventional distributed systems concentrate on protection of data processing, such as protection against unauthorized database access. In addition to data security, an intelligent network must support call processing and multimedia services, including voice and video services. Such a wide range of services requires more systematic and sophisticated protection mechanisms. Conventional distributed systems assume overall control of a collection of computer systems.

The service architecture of future intelligent networks allows some outside service providers to share the telephone network resources and services to support enhanced services. Moreover, the telephone company allows a certain degree of customer control over purchased services. Such special relationships between the telephone company and service providers, and between the telephone company and customers, require an additional degree of protection which has not been well-handled by the security measures of conventional distributed systems.

It is a general object of the present invention to provide security techniques for a distributed intelligent network.

It is another object of the present invention to provide techniques for maintaining security in an intelligent network when a process at one network node requests access to a resource at another node.

It is a further object of the present invention to provide security safeguards for a distributed intelligent network that utilize capability and signature techniques.

It is further object of the present invention to provide techniques for prevention of unauthorized access to network resources and network services in intelligent networks.

SUMMARY OF THE INVENTION

According to the present invention, these and other objects and advantages are achieved in a security technique for use in an intelligent network having a plurality of nodes. The security technique provides a method for authorizing access by a process located in an invocation node to an object, or a network resource, located in an execution node. The method comprises the steps of granting permission to the invocation node to access the object by transmitting a capability and a signature from the execution node, where the object is located, to the invocation node. The capability includes a unique identifier of the object and access rights to the object. The signature is formed at the execution node by encryption of the capability with an encryption key that is unique to the invocation node and is stored only in the execution node. The capability and the signature are retained by the invocation node for subsequent use when requesting access to the object. A request for access to the object is transmitted with the capability and the signature from the invocation node to the execution node. At the execution node, the capability received from the invocation node is encrypted with the encryption key that is associated with the invocation node to form a test signature. Access to the object is authorized only when the test signature matches the signature received from the invocation node.

A different encryption key is stored at the execution node for each other node in the system having permission to access the object. Since the encryption keys are known only to the execution node and the capability is used in encrypting the signature, the capability is protected against theft by another node and modification by the authorized node. The permission of a node to access the object is revoked by cancelling or changing the encryption key associated with that node.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
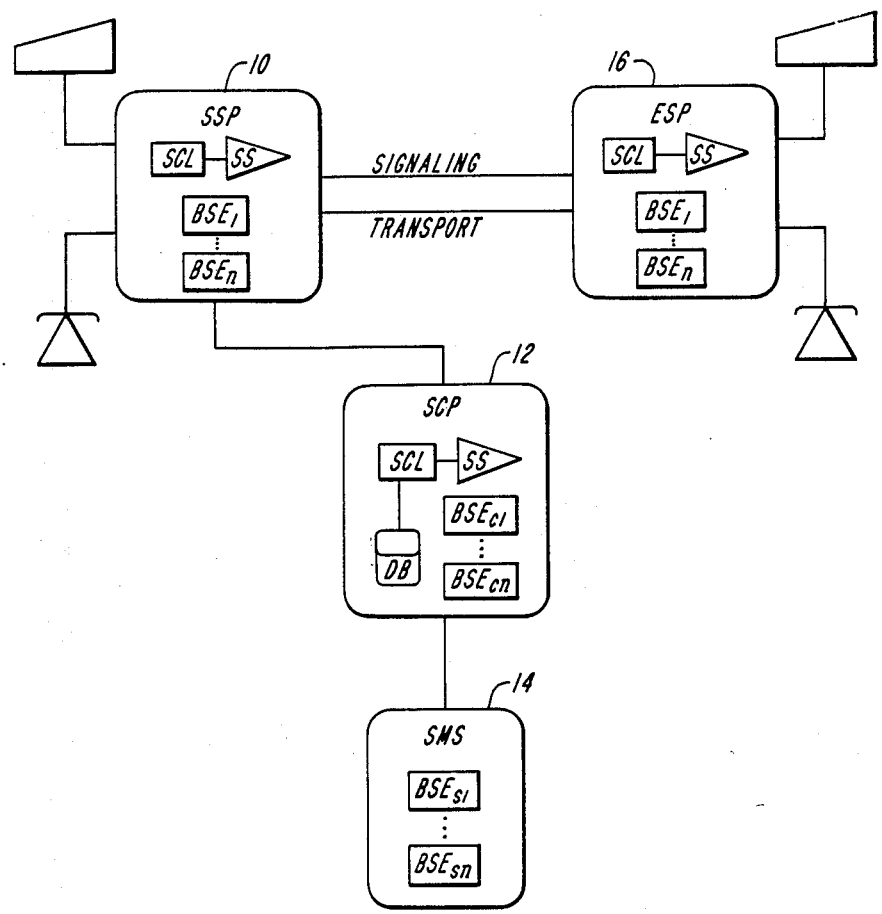
FIG. 1 is a block diagram illustrating the architecture of a distributed intelligent network.

An example of a distributed network service architecture is shown in FIG. 1. The network includes interconnected nodes 10, 12, 14 and 16. Node 10, a service switching point labelled SSP, is a network switch which has functions to process a call. Node 12, a service control point labelled SCP, is a network database which contains service control logic (SCL), service scripts (SS) and customer specific information. Node 14, a service management system labelled SMS, is an administration and control system which supplies operations for the creation of service script, for updates to the database in node 12 and for the support of customer control over services. The service switching point 10 is also connected to node 16, which is an enhanced service provider, labelled ESP, outside the network. The enhanced service provider at node 16 can utilize basic service elements provided by the service switching point.

In the intelligent network, each customer service can be decomposed into a number of basic service elements, labelled BSE's. If a service is considered a program, the basic service elements of the service are the instructions of that program. As a service example, a service call received by the service switching point 10 is interpreted by the service control logic located at the service control point 12, and a service script located at the service control point invokes BSE's at the service switching point 10.

The intelligent network described above permits rapid deployment of new service functions and also permits customers to gain more control over their network configuration. Security problems that result from powerful customer control include: (1) unauthorized disclosure and modification of customer databases by other customers, and (2) the danger that customers will access and/or change network control information, such as communication control. To prevent such security problems, the network must be equipped with protection mechanisms to insure data security and network integrity.

With the architecture described above, outside service providers can access service elements of the telephone network. Also, the telephone network can take advantage of services provided by enhanced service providers. Thus, network vendors are more dependent on each other. In fact, the entire communication network, including the enhanced service providers, forms a distributed network. However, unlike general distributed systems which allow sharing of all resources provided by the network, the sharing of resources in the above-described system is more restricted. For example, some basic service elements are strictly internal to the telephone network and cannot be accessed by outside network vendors. Also, the set of basic service elements that the telephone network allows one service provider to access may be different from those allowed for another service provider. The security problems associated with unauthorized use of network components must be prevented.

In a distributed architecture, the protection mechanisms for network security and integrity should themselves be distributed. This poses an additional security problem in that the integrity of the protection mechanisms must be assured. The protection mechanisms, when transmitted from one network node to another, become unprotected. The protection mechanisms are easily forged, stolen, modified or destroyed. Thus, security safeguards are required to protect transmitted protection mechanisms.

The intelligent network shown in FIG. 1 and described hereinabove is characterized as an object-oriented distributed system. Each network node, such as the service switching point 10, the service control point 12 and the enhanced service provider 16, maintains a set of objects. The objects are associated with network resources and sets of interface operations. Network resources include physical resources, such as access lines and I/O devices, and logic resources, such as data files and directories. Interface operations of an object are basic service elements that can exclusively manipulate the resources contained in that object. Customers can access the network resources only through the invocation of the basic service elements of the corresponding objects.

Figure 2:
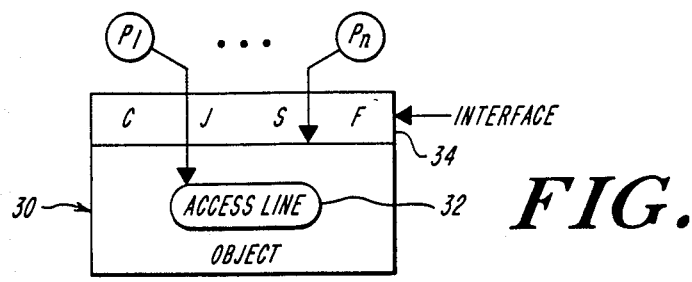
FIG. 2 is a schematic diagram illustrating an object in an intelligent network.

An example of a call processing object 30 is shown in FIG. 2. The object 30 includes a network resource, such as an access line 32, and a set of interface operations 34. In the example of FIG. 2, interface operations 34 include C=CREATE (creates a line for connection to the called party), J=JOIN (connects a line to a call), S=SPLIT (separates a line from a connection) and F=FREE (releases a line to disconnect a call). The processes, $P_l$-$P_n$ can access the object 32 through interface operations 34. The processes $P_l$-$P_n$ may be in the same node as the object 32 or in a remote node.

Services are defined by service scripts or programs contained in appropriate network nodes such as the service control point 12. A service script is a sequence of basic service elements of objects distributed in the network. When a customer requests a service at a network node, the node operating system creates a process on behalf of the customer. The process then performs the requested service according to the actions defined in the script. When the service invokes basic service elements of objects within other network nodes, these basic service elements are carried out by exchanging messages between the invoking process and the invoked objects. After making invocation, a process waits for a reply from the object. In the following discussion, the node where the invoking process is located is called the invocation node, and the node where the invoked object is located is called the execution node.

Objects can be identified and protected using a mechanism called capability. The notion of the capability is disclosed by Dennis and Van Horn in "Programming Semantics for Multiprogrammed Computations", *Comm. ACM,* Vol. 9, No. 3, March 1966, pp 143–154. A capability is a unique identifier of an object and a permission that gives a process the right to access the object. A conventional capability is a data structure that contains two fields: a unique object identifier (UID) and an access right (AR) to the object. The unique identifier is used to locate a systemwide object. The UID is unique in the sense that no two objects can have the same UID, and no UID may be reused. The access right field contains a mapping of bits of allowed interface operations to the object. In the case of an IN/2 object, the allowed accesses are the basic service elements of that object. For example, a capability for a call processing object, as shown in FIG. 2. and described hereinabove, contains a UID for the object and a four bit access right field representing CREATE, JOIN, SPLIT and FREE.

Capabilities provide a basis for protecting objects in object oriented systems. When an object is created, the operating system returns a capability to the process that owns the new object. The process protects the returned capability by storing it in a capability segment to which access is controlled by the process. When the process requires access to an object, it retrieves the capability for the object from its capability segment and presents the capability to an object manager. The possession of a capability for an object is sufficient for a process to access that object, if the interface operation is legitimate. That is, a process is allowed to invoke a basic service element of an object when it possesses a capability for the object and when the invoked basic service element is authorized by the access right field of the capability. Capabilities for the same object may have different access rights depending on the authorization granted to the invoking process.

To describe the security requirements for the system, it is necessary to specify entities to be protected and entities to be protected against. In object-oriented networks, network objects are the entities that must be protected. Processes on behalf of customers are the entities that must be protected against. The security requirement for the intelligent network is that no process can access an object without permission. This security requirement has the following implications: (1) an object is associated with a permission or ticket which must be presented before the object can be accessed, (2) a process must obtain permissions to those objects that are required complete the desired service, (3) a process may perform only legitimate accesses which are specified by the permission to the authorized objects. To fulfill the first and third requirements, a definition of permission and a distributed mechanism to control the use of the permission are required. To fulfill the second requirement, the system should give authorized processes the required permissions and maintain these permissions in a secure way.

The permission concept is the key to a secure intelligent network. Objects can reside in different network nodes such as the service switching point 10, the enhanced service provider 16 or the service control point 12. When a process requires access to objects at other network nodes, the capabilities for those objects must be transmitted to the network node where the process resides. However, capabilities when transmitted from a network node become unprotected and can easily be forged, stolen or modified. For example, a malicious enhanced service provider can intercept capabilities transmitted from the service switching point 10 and use them to access service switching point objects without permission, or it can modify the transmitted capabilities and prevent other processes from accessing the objects at the service switching point. Therefore, transmitted capabilities must be protected.

Figure 3:
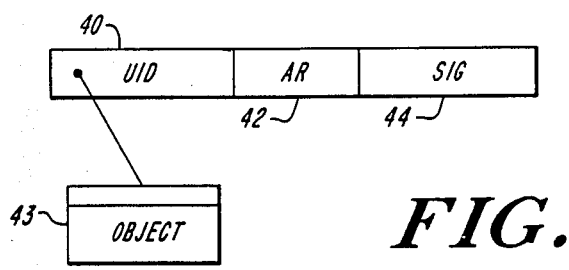
FIG. 3 is a schematic diagram illustrating a capability, and a signature used for security protection in accordance with the present invention.

In accordance with the invention, a transmitted capability is protected by a field called a signature which insures that the transmitted permission cannot be forged. A permission to access an object is represented by a capability and a signature, as shown in FIG. 3. The capability includes an object identifier field 40 (UID) and an access right field 42 (AR). The object identifier field 40 is the unique identifier of an object 43 contained in one of the nodes of the system. The access right field 42 indicates the legitimate basic service elements that can be performed by the holder of the capability on the identified objects. The object identifier and the access right fields are equivalent to those of a conventional capability. In order to make the identifier unique within the entire network, an object identity can be formed by concatenating the node address and the address of the object within that node.

Figure 5:
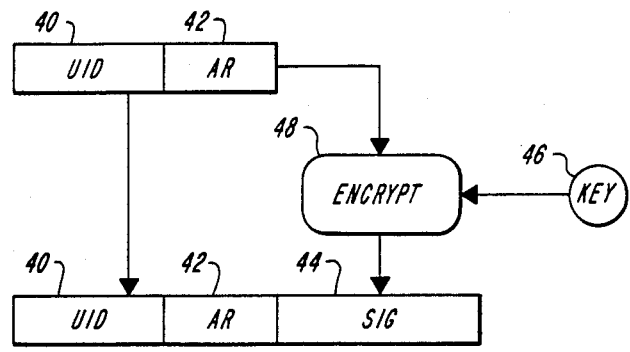
FIG. 5 illustrates the technique used by the execution node for generating a signature.

A signature 44 is used to protect the capability. The signature 44 is obtained as shown in FIG. 5 by encrypting the object identifier field 40 and the access right field 42 with an encryption key 46 in an encryption step 48. The encryption key 46 is secured in the node operating system of the node where the object of located. Encryption using the contents of the capability insures that the signature 44 cannot be computed without knowing the encryption key 46. Should the signature 44 be derived from computations using information other than the capability, an intruder would be able to predict the value of the signature and to substitute the object identifier and access rights.

The encryption key 46 is maintained at the node where the object resides and is not transmitted to any other node. Furthermore, a unique encryption key is associated with each node in the system. Thus, when permission is granted to one node, a first encryption key associated with that node is used to encrypt the signature. When permission to access the object is granted to another node, a second encryption key, different from the first, is used to encrypt the signature. Since a unique encryption key is associated with each node in the system, a stolen capability cannot be used by another node to access the object.

Figure 4:
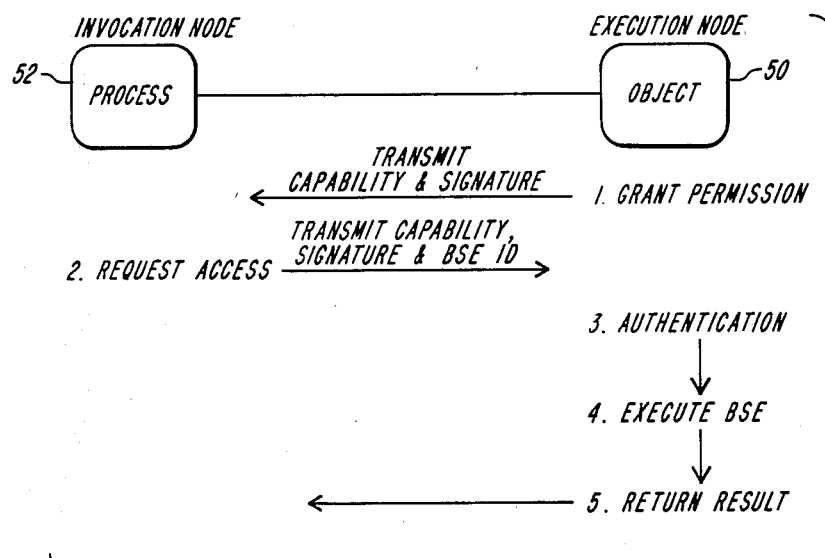
FIG. 4 illustrates remote network object access incorporating the security procedure of the present invention.

A procedure for remote access to an object utilizing the security procedure of the invention is illustrated in FIG. 4. An object to be accessed is located at an execution node 50. A process requiring access to the object is located at an invocation node 52. The execution node 50 first grants permission to access the object by generating a capability and a signature, and transmitting the capability and the signature to the invocation node 52. The signature 44 is generated as illustrated in FIG. 5 and described hereinabove. The granting of permission is associated with contract formation in which selected object accesses are agreed upon. The capability and the signature are stored by the invocation node 52 for future use. At a later time, when the process at the invocation node 52 wishes to access the object at execution node 50, the process transmits the capability, the signature and the identity of the basic service element to the execution node 50. The execution node 50 then authenticates the capability, as described hereinafter, and if access is authorized, executes the requested basic service element and returns the result to the invocation node 52.

Figure 6:
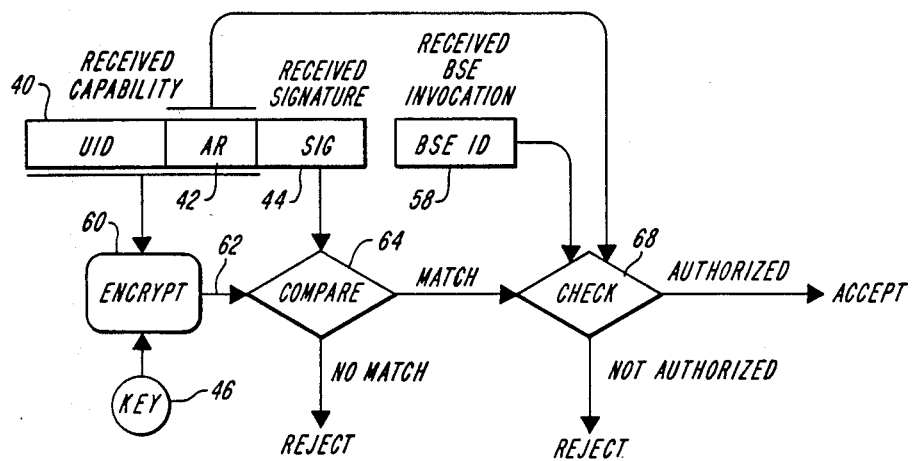
FIG. 6 illustrates the procedure used by the execution node for authenticating a request for access to an object.

When a process wishes to access an object at another node, it transmits the corresponding capability and signature, and a basic service element identity to that node. The node operating system at the node which contains the object (execution node) authenticates the received capability. As shown in FIG. 6, the object identifier 40 and the access rights 42 of the received capability are encrypted with the encryption key 46 in an encryption step 60. The encryption key 46 corresponds to the node that transmitted the capability and is the same encryption key that was used to grant permission to that node. An output 62 of the encryption step 60 is a test signature. The test signature should be identical to the signature which was received with the request for access to the object. The test signature on output 62 is compared with the received signature in a comparison step 64. If the two do not match, the access request is rejected. When the test signature matches the received signature, a further test is required. The basic service element identity 58 received from the remote node is checked against the access rights 42 in the received capability to determine if the access right was granted with the permission. If the access right was granted, the access request is authorized and the requested operation is performed. Otherwise, the request is rejected.

The authentication technique shown in FIG. 6 provides secure access to objects in remote nodes. If the capability is modified by the node to which permission has been granted, the test signature will not match the received signature. If the capability is stolen by another node, the test signature will not match the received signature because a different encryption key is associated with each remote node. Since the encryption keys are maintained only in the execution node where the object resides, the remote nodes cannot generate a valid capability and signature. In order to revoke permission granted to a remote node, it is a simple matter to alter or cancel the encryption key for that node. The signature technique disclosed herein facilitates the management of transmitted capabilities because a node operating system is required to store only the encryption keys for the transmitted capabilities and not the signatures and capabilities, which is likely to require more storage space.

The protection of capabilities is one of the most important issues in capability-based systems. If a user or a process can modify a capability, access to a different object can be forged by changing the object identifier and access right fields of an existing capability. The permission technique disclosed herein utilizes a capability with signature. Although unauthorized modification of capabilities cannot be prevented, the unauthorized modification is always detected by authenticating the signatures as described above and rejecting the forged ones. The received signature would not match the test signature if the capability has been changed, since the signature is derived from the contents of the capability itself.

Protection against capability theft is as important as protection against modification of capabilities in a distributed network. To protect against capability theft, permissions transmitted to different nodes are different. Since the object identifier of a capability is unique, the only way to make the transmitted permissions for the same object different is to generate different signatures for different nodes. Each node maintains a set of encryption keys, one corresponding to each different destination node. The multiple key technique prevents capability theft by encrypting the contents of a capability using different encryption keys for different nodes. The assumption underlying this technique is that an intruder can forge almost all parts of a transmitted message except the node address which is implemented using the network interface hardware or a lower level control. When receiving a transmitted capability, the execution node uses the address of the invocation node as an index to find the required encryption key. A test signature is then computed from the received capability as shown in FIG. 6 and described hereinabove. If the received capability is stolen, the computed test signature will be different from the received signature, and the stolen capability will be rejected.

Figure 7:
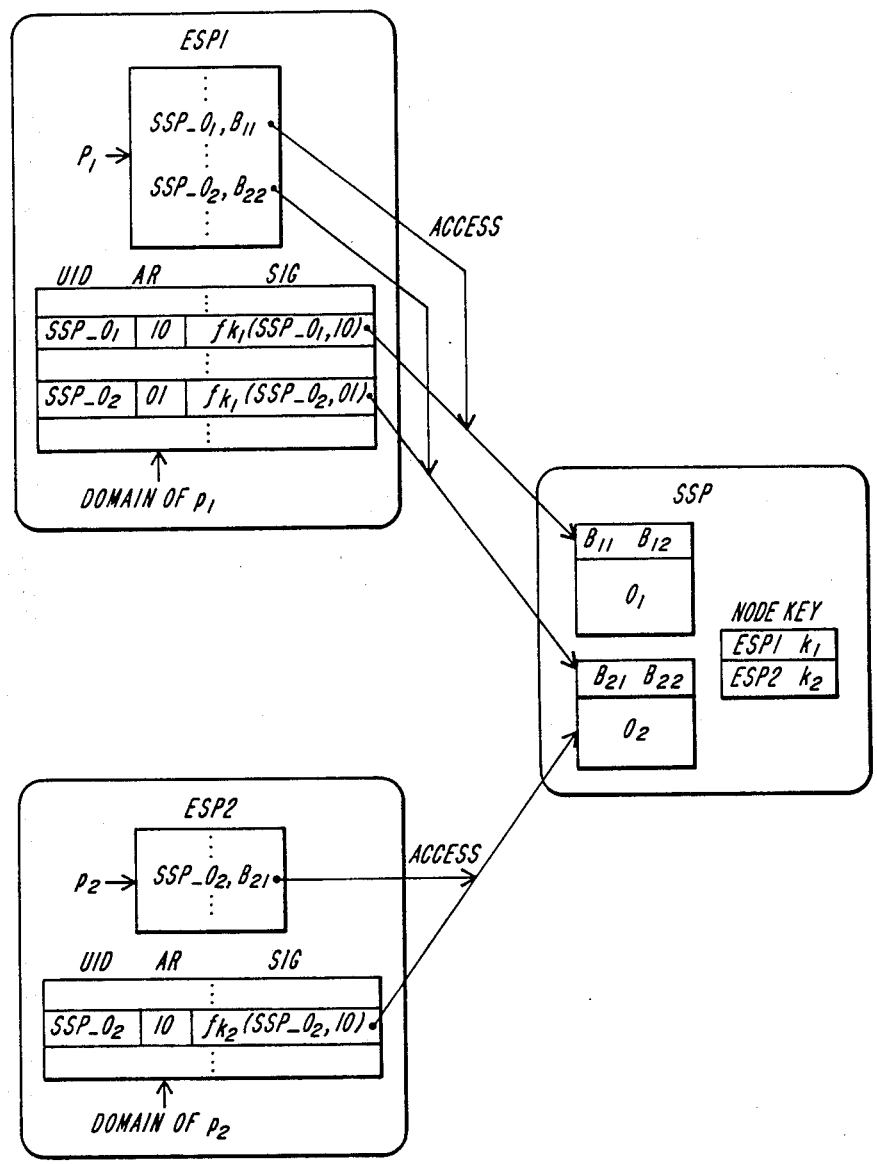
FIG. 7 is a block diagram illustrating an example of the security procedure of the present invention.

An example of the security structure of the present invention is illustrated in FIG. 7. A process $p_1$ at a node ESP 1 and a process $p_2$ at a node ESP 2 require access to objects at a node SSP. The process $p_1$ requires access to object $O_1$ through basic service element $B_{11}$ and requires access to object $O_2$ through basic service element $B_{22}$. The process $p_2$ requires access to object $O_2$ through basic service element $B_{21}$. Associated with each of the access requests is a capability including a unique identifier of the object and an access right, and a signature which have been previously transmitted to the respective nodes from the SSP node. The SSP node maintains an encryption key $k_1$ corresponding to node ESP 1 and an encryption key $k_2$ corresponding to node ESP 2. The keys $k_1$ and $k_2$ are used by node SSP for authentication of the requests received from nodes ESP 1 and ESP 2, respectively, as shown in FIG. 6 and described hereinabove.

A network service is a sequence of computation blocks. Each computation block is associated with an execution environment called a domain which insures that the computation meets the security requirement. The domain of a computation block is a list of references to objects which must be accessed during the execution of the computation block. In a capability-based system, a domain is a list of capabilities that identifies all referenced objects and the allowed operations which the computation may perform on the objects.

Computation blocks of a network service are basic service elements and other services that implement the network service. Some basic service elements may invoke basic service elements of other more primitive objects. The list of capabilities for these objects constitutes the domain of such a basic service element. Thus, a process which represents the network service executes in a sequence of domains, each associated with execution of a basic service element or execution of a requested service. Since a process is itself a computation block, there is a domain for a process. The domains for processes $p_1$ and $p_2$ are illustrated in FIG. 7.

The domain of a computation block may contain two groups of capabilities, a static group and a dynamic group. The static group includes those objects which are specified directly within the computation block and are potentially accessed. The dynamic group includes those objects, such as parameters, which are specified indirectly through the interface of the computation block. In the case of network services, the static capabilities are the same for different processes which represent the same service for different customers. The dynamic capabilities are dependent on the attributes of the invoking customer, such as the name of the customer. Static capabilities can be specified when a service is built, while dynamic capabilities are specified when a process is created. The attributes needed for dynamic capabilities cannot be determined until execution time.

A process may invoke more than one basic service element before it terminates. Each invoked basic service element operates in a different domain that is determined by the objects and operations which the basic service element may access. If the domain of a process is defined as including all domains that are associated with all invoked basic service elements, then the process may exercise privileges at unexpected times and compromise security. For example, a process can take advantage of capabilities it obtained from the domain of previously-accessed basic service elements to access objects which are not authorized in the current execution domain.

For security reasons, the domains in which a process executes at any instance of time must obey the principle of least privilege. That is, every process in the system should operate using the simplest set of access rights necessary to complete a service at any time. Therefore, a process switches domain every time the process accesses an object. Each process starts its execution in an initial domain which contains the capabilities for all objects and other services that are invoked directly by the process. When the process invokes a basic service element or another service, it temporarily leaves the current domain and enters the domain associated with the invoked basic service element or service. After completing the operation, the process returns to the previous domain.

The domain switch mechanism is implemented as follows. Each node operating system maintains a set of capabilities necessary for the execution of all services defined at that node. The capabilities used for remote object accesses are transmitted from the corresponding source nodes using the multi key signature scheme described hereinabove. When a service is requested, the node operating system creates a process and an initial domain for the service. The process then starts from the initial domain. When a process wishes to call a procedure (a basic service element or another service), the operating system of the node in which the invoked procedure is located creates a new domain which contains the capabilities that are required for the invoked procedure. The process executes in this new domain until the procedure is completed. Then it returns to the previous domain. If an invocation contains capabilities as parameters, the node operating system examines the capabilities and accepts the invocation if the parameter capabilities match the capability types specified at the procedure interface. The accepted capabilities are constructed as dynamic capabilities in the domain of the invoked procedure. The process can then switch domain to that of the invoked procedure.

While there has been shown and described what is at present considered the preferred embodiments of the present invention, it will be obvious to those skilled in the art that various changes and modifications ma be made therein without departing from the scope of the invention as defined by the appended claims.

What is claimed is:

1. In an intelligent network having a plurality of nodes, a method for authorizing access by a process located in an invocation node to an object located in an execution node, comprising the steps of:

granting permission to the invocation node to access the object by transmitting a capability and a signature from the execution node to the invocation node, said capability including a unique identifier of the object and access rights to the object, said signature being formed by encryption of the capability with an encryption key unique to the invocation node and stored only in the execution node;

transmitting a request for access to the object from the invocation node to the execution node, said request being transmitted with said capability and said signature;

at said execution node, encrypting the capability received from the invocation node with said encryption key to form a test signature; and authorizing access to the object only when the test signature matches the signature received from the invocation node.

2. A method for authorizing access as defined in claim 1 further including the steps of granting permission to access the object to one or more nodes different from said invocation node, and using a different encryption key for forming the signatures transmitted to each of the different nodes to which permission has been granted.

3. A method for authorizing access as defined in claim 2 further including the step of revoking the permission of a selected node to access the object by cancelling or changing the encryption key associated with the selected node.

4. A method for authorizing access as defined in claim 1 wherein the step of transmitting a request for access includes the steps of transmitting the identity of a required basic service element from the invocation node to the execution node, and checking the access right received from the invocation node to determine if the access right required to execute the basic service element has been granted.

5. In an intelligent network having at least two nodes, a method for maintaining security when a process in a first node requests access to an object located in a second node, comprising the steps of:

transmitting a request for access to the object from the first node to the second node with a capability and a signature, said capability including a unique identifier of the object and access rights to the object;

at the second node, encrypting the capability received from the first node with an encryption key associated with the first node to form a test signature; and authorizing access to the object only when the test signature matches the signature received from the first node.

6. A method for maintaining security as defined in claim 5 further including the step of storing an encryption key corresponding to each node in said intelligent network to which permission to access the object has been granted.

7. A method for maintaining security as defined in claim 5 wherein the step of transmitting a request for access to the object includes the steps of transmitting the identity of a basic service element from the first node to the second node, and checking the basic service element against the access right of the capability to determine if the required access right has been granted.

* * * * *